United States Patent [19]

Carvalheiro et al.

[11] Patent Number: 5,402,901
[45] Date of Patent: Apr. 4, 1995

[54] CLOSURE DEVICE FOR A RECIPIENT

[75] Inventors: José Carvalheiro, Paris; Alain Franchet, Brasles; Vincent Guerrazzi, Amberieu en Bugey; Pierre Pellerano, Paris, all of France

[73] Assignee: Le Moulage Automatique, Chateau Thierry, France

[21] Appl. No.: 128,384

[22] Filed: Sep. 29, 1993

[30] Foreign Application Priority Data

Feb. 9, 1993 [FR] France .................. 93 01410
Jun. 10, 1993 [FR] France .................. 93 07012

[51] Int. Cl.⁶ .......................................... B65D 41/34
[52] U.S. Cl. ............................................ 215/252
[58] Field of Search ................................ 215/252

[56] References Cited
U.S. PATENT DOCUMENTS

| 4,461,391 | 7/1984 | Davis | 215/252 |
|---|---|---|---|
| 4,527,705 | 7/1985 | Prades | 215/252 |
| 4,529,096 | 7/1985 | Chartier et al. | 215/252 |
| 4,549,667 | 10/1985 | Dullabaun | 215/252 |
| 4,550,843 | 11/1985 | Nolan | 215/252 |
| 4,715,506 | 12/1987 | McLaren | 215/252 |
| 4,744,480 | 5/1988 | Luch et al. | 215/252 |
| 4,756,438 | 7/1988 | Ryder | 215/252 |
| 4,828,127 | 5/1989 | Young et al. | 215/252 |
| 4,907,709 | 3/1990 | Abe et al. | 215/252 |
| 5,273,173 | 12/1993 | Debetencourt | 215/252 |

Primary Examiner—Allan N. Shoap
Assistant Examiner—Vanessa Caretto
Attorney, Agent, or Firm—Nawrocki, Rooney & Sivertson

[57] ABSTRACT

A closure device for a recipient with a threaded neck. It includes a tapped closure having a lower part attached to a guarantee strip by a zone of connection of low mechanical resistance, the strip presenting an elastically-deformable, inner, annular bead adapted to clip beneath a holding flange formed on a lower periphery of the neck by forced screwing of the closure; and an outer peripheral boss axially separated from the bead by a zone of controlled elastic deformation, an upper face of the boss and a lower edge of a lateral wall of the closure having formed therein, respectively, at least one tooth and at least one notch, the tooth being intended to be temporarily received in the notch during screwing when the bead is in abutment with the holding flange in order to avoid any relative rotational displacement of the closure with respect to the strip and to ensure clipping without deteriorating the zone of connection.

9 Claims, 3 Drawing Sheets

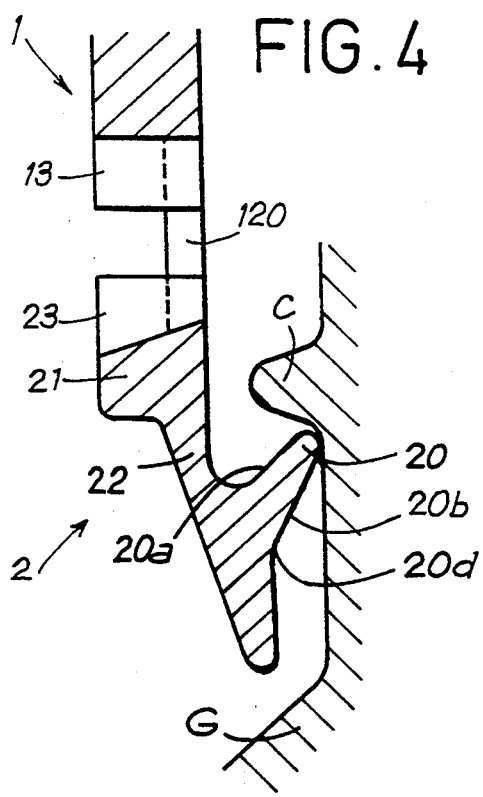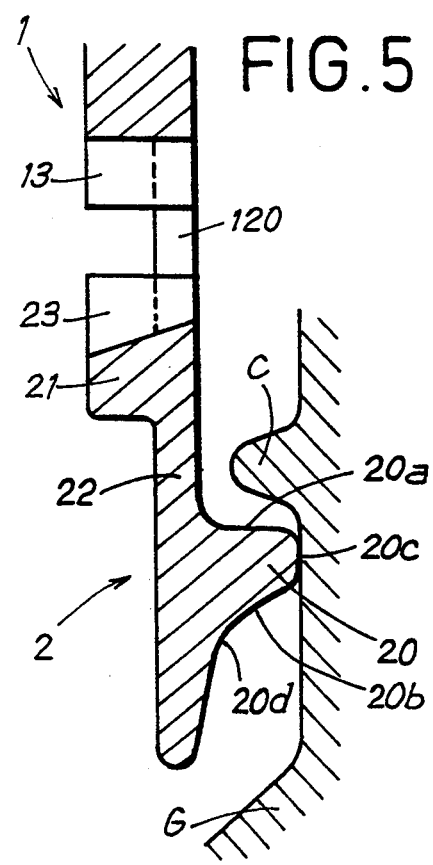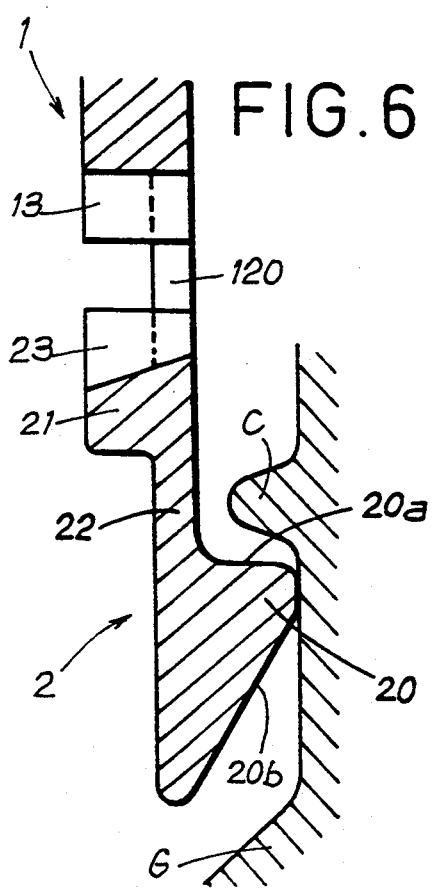

5,402,901

CLOSURE DEVICE FOR A RECIPIENT

FIELD OF THE INVENTION

The present invention relates to a closure device for a recipient.

BACKGROUND OF THE INVENTION

French Patent Application No. 93 01410 already describes a closure device for a recipient with threaded neck, comprising a tapped closure of which the lower part is attached to a guarantee strip by a zone of connection with low mechanical resistance; said strip presenting an elastically deformable, inner, annular bead intended to clip beneath a holding flange made on the lower periphery of said neck by forced screwing of the closure and an outer peripheral boss separated from said bead by a zone with controlled elastic deformation.

However, when the strip is immobilized since the bead is in bearing abutment on the flange of the recipient and screwing continues, there are produced a compression and a relative displacement of the closure with respect to the strip which provokes rupture of the zone of connection of low mechanical resistance before the bead has passed beneath the flange.

Now, in order to perfect the guarantee strip, it is desirable to make a considerably projecting inner bead whilst fragilizing to a maximum the zone of connection in order to guarantee the obviousness of the first opening, whilst facilitating it.

It is an object of the present invention satisfactorily to overcome the technical problems set forth hereinabove.

SUMMARY OF THE INVENTION

This object is attained according to the invention by means of a closure device as described hereinbefore and in which the upper face of the boss and the lower edge of the lateral wall of the closure comprise at least one tooth and/or at least one notch; said tooth being intended to be temporarily housed in said notch during screwing when said bead is in abutment on the holding flange in order to avoid any relative displacement of the closure with respect to the strip and to ensure transmission of the effort of clipping without deteriorating the zone of connection.

According to an advantageous characteristic of the invention, the width of the upper face of the bead is greater than or equal to the width of the flange of the recipient.

Moreover, the upper face of the bead is substantially perpendicular to the axis of the closure.

According to another characteristic, the zone with controlled deformation presents an inner face having a curvature and/or an inclination with respect to the axis of the closure.

According to yet another characteristic, the lower, inner face of said bead is inclined by an angle, $\alpha$ with respect to the axis of the closure, with the result that the controlled deformation of the deformable zone is translated by a bending and a contraction of the lower part of the strip towards the axis of the neck.

The lower, inner face of the bead comprises a line of inflexion.

The periphery of the bead possibly comprises one or more interruptions.

The dimensions of the tooth and/or of the notch as well as their respective lateral clearance are determined so that the rear, lateral face of the tooth, with reference to the direction of screwing, penetrates at least partially into said notch and is in abutment against the rear, lateral face of said notch before attaining the limiting value of the tensile strength of the zone of connection.

Furthermore, the numbers and distribution of the teeth and notches as well as their respective vertical clearance are determined as a function of the mechanical resistance of the zone of connection and their respective horizontal surface for mutual bearing contact, necessary for tranmitting the vertical effort of clipping.

The closure device according to the invention may be easily manufactured by injection moulding without raising difficulties at demoulding by transverse disengagement of the moulding parts. Assembly of the tapped closure by forced screwing does not destroy the zone of connection between the closure and the guarantee strip.

Under these conditions, this zone of connection may be fragilized all the more, for example by making a smaller number of bridges and/or by reducing their section and height.

Moreover, the guarantee is reinforced by the presence of a sufficiently wide, considerably projecting, inner bead.

BRIEF DESCRIPTION OF THE DRAWINGS

The invention will be more readily understood on reading the following description with reference to the accompanying drawings, in which:

FIGS. 4, 5 and 6 are other embodiments of the invention.

DETAILED DESCRIPTION OF THE DRAWINGS

Figure 1:
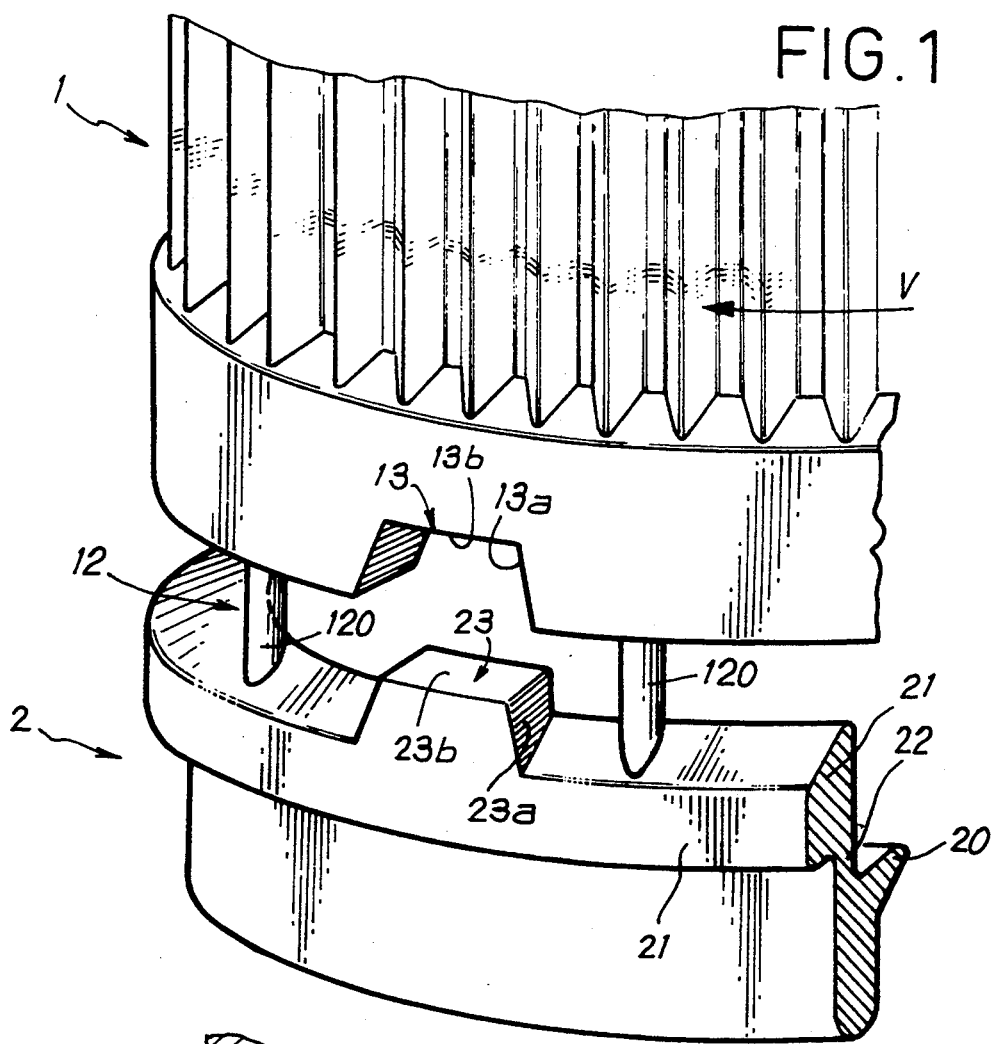
FIG. 1 is a partial perspective view of the device of the invention.
Figure 2:
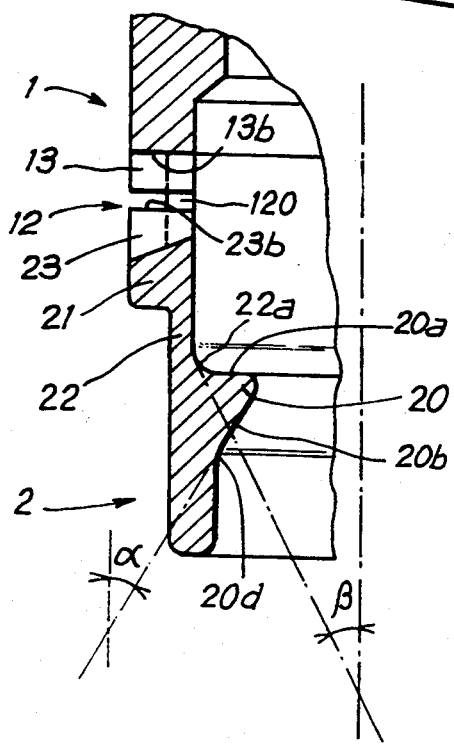
FIG. 2 is a view in partial section of the device of FIG. 1.
Figure 3A:
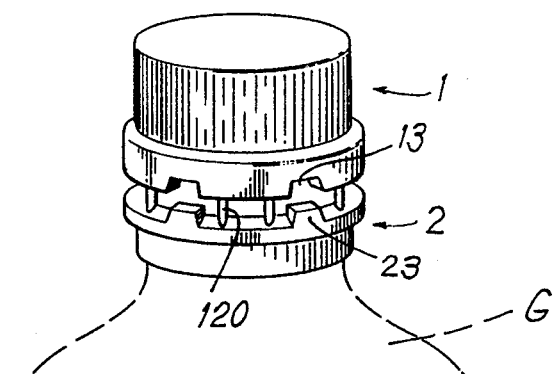
FIGS. 3a, 3b, 3c and 3d are views in perspective of the device of the invention in different positions during screwing on the recipient-filling line.
Figure 3B:
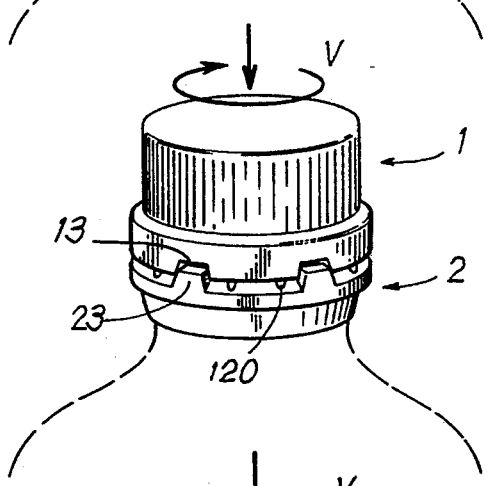
Figure 3C:
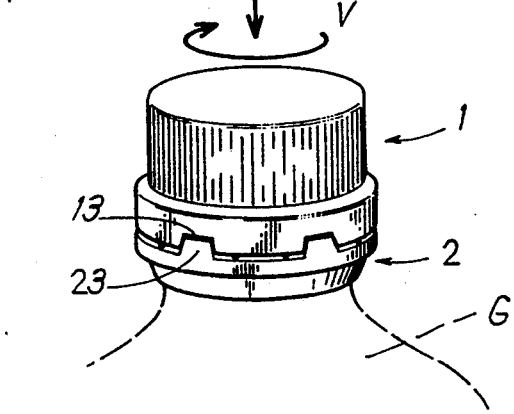
Figure 3D:
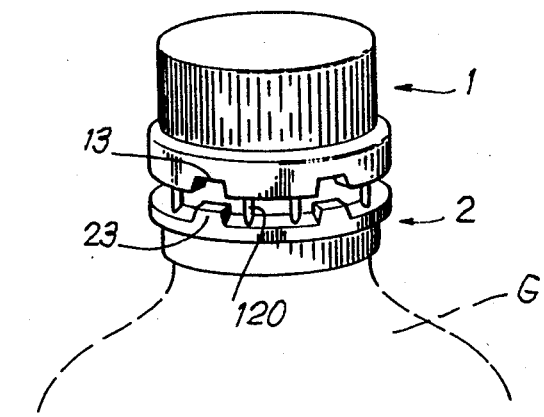

Referring now to the drawings, FIGS. 1 and 2 show the closure device of the invention. This device is intended to be mounted on the threaded neck of a recipient (not shown).

The closure device comprises a tapped closure 1 extended in its lower part by a detachable guarantee strip or ring 2 attached to the closure 1 by a zone of connection 12 with low mechanical resistance.

The fragile character of this zone of connection may be obtained after moulding by subsequent cut-out or as soon as the closure is moulded.

The zone of connection 12 is preferably constituted by bridges 120 spaced around the periphery of the zone of connection 12. These bridges may be made by cut-out in a moulded resistant strip or by direct moulding of fragile elements.

The device is mounted on the threaded neck of the recipient by forced screwing, up to appropriate clipping and contraction.

Strip 2 presents an inner annular bead 20 for retention on a holding flange C made on the lower periphery of the neck G of the recipient (shown in FIGS. 4, 5 and 6).

The upper face 20a of bead 20 is, at rest, substantially perpendicular to the axis of the closure 1, whilst its lower, inner face 20b is inclined by an angle $\alpha$ with respect to the axis of said closure.

The lower, inner face 20b comprises a line of inflexion 20d whose position is determined as a function of the value of angle $\alpha$.

Strip 2 also comprises an outer peripheral boss 21 separated from bead 20 by a zone 22 with controlled deformation. Zone 22 with controlled elastic deformation presents an inner face 22a having a curvature and/or an inclination by an angle $\beta$ with respect to the axis of the closure.

The angle $\alpha$ between the lower, inner face of the bead 20 and the vertical axis of the closure is a function of the profile of the holding flange C, the inner diameter of the projecting part of the strip 2 at the level of the bead 20, and of the height of that part of said strip located beneath the upper face 20a of the bead 20.

This angle $\alpha$ is determined so that the controlled deformation of zone 22 is translated by a bending and contraction of the lower part of the strip 2 towards the axis of the neck.

The upper face of the boss 21 comprises at least one tooth 23 intended to be temporarily housed in a corresponding notch 13 made on the lower edge of the lateral wall of the closure 1 during final screwing, when the bead 20 is already in abutment on the holding flange of the recipient.

The number of teeth 23 and of notches 13 will be a function of the mechanical resistance of the zone of connection 12 and of the total horizontal surface for mutual bearing contact necessary for transmitting the vertical effort of clipping (that is, snapping bead 20 over holding flange C to effectively clip closure 1 to recipient G).

This surface is constituted by the sum of the upper surfaces 23b of the teeth 23.

Of course, in accordance with other embodiments (not shown), it is the lower edge of the lateral wall of the closure 1 which comprises at least one tooth and the upper face of the boss 21 which comprises at least one corresponding notch. In the same way, alternating teeth and notches may be made on the upper face of the boss 21. One or more complementary teeth may possibly be added on the boss 21 without a corresponding notch being provided on the lower edge of the closure in order to increase the total horizontal bearing surface for clipping.

FIGS. 3a, 3b, 3c and 3d illustrate the first positioning of the closure on the threaded neck G (shown in FIG. 4) of a recipient after it has been filled on the packing line.

In a first step, bead 20 comes, via its lower inner face 20b, into abutment on the holding flange C of the recipient G (shown in FIGS. 4, 5 and 6).

In a second step, continued forced screwing from this position of blocking firstly provokes compression of the zone of connection 12 then, on the one hand, the elastic deformation of the bead 20 and, on the other hand, the controlled deformation of zone 22.

During this phase, the bridges 120 undergo an elastic deformation due to the relative displacement of the body of the closure 1 with respect to the strip 2. This deformation consists in a transverse flexion in the direction of screwing V which has for effect to reduce the distance separating the lower part of the closure from the upper part of the strip. This transverse flexion continues until the teeth 23 penetrate in the notches 13. The height of the teeth 23 is, in this respect, with reference to the direction of screwing V, determined so that their rear lateral face 23a penetrates at least partially in the direction of screwing in the notches 13 and are in abutment against the rear lateral face 13a of said notches, before attaining the limiting value of the tensile strength of the bridges 120.

This limiting value determines the maximum clearance allowed between the opposite rear lateral faces 23a, 13a of the teeth 23 and the notches 13.

It is clear that, under these conditions, the respective opposite front faces of the teeth 23 and the notches 13 are not in contact and may thus present any profile.

The preceding deformations are produced due to the transmission of the vertical effort of compression by contact of the respective horizontal bearing faces 13b, 23b of the notches 13 and the teeth 23.

Moreover, any relative displacement of the closure 1 with respect to the strip 2 is avoided by driving contact of the respective lateral bearing faces 13a, 23a of the notches 13 and the teeth 23.

Consequently, forced screwing is translated by the rotation of the closure 1/strip 2 assembly without breaking stress of bridges 120.

As mentioned hereinabove, this effect of combination between the teeth 23 and the notches 13 protects the zone of connection 12 from a possible rupture or deterioration whilst allowing optimum fragilization.

All these elastic deformations lead to the retraction of the inner end of bead 20 until the inclined lower face 20b of the bead becomes substantially parallel to the axis of the closure, by following the outer profile of the flange C.

The bridges 120 thus undergo only a limited deformation in flexion during screwing leading to clipping.

In a third step, the parts under considerable elastic stress then slacken as soon as the upper face 20a of the bead 20 has passed beneath the holding flange C, which provokes clipping thereof.

At the end of screwing, the teeth 23 are disengaged from the notches 13 and the strip 2 is now fast with the closure 1 only by the zone of connection 12 with low resistance. Parallel to this, the zone 22 with controlled deformation tends to resume its initial form by straightening up the lower part of the strip 2 substantially parallel to the axis of the closure (cf. also FIGS. 5 and 6).

It is clear that, whilst seeking to make bridges with low mechanical resistance, the dimensions of the teeth 23 and/or of the notches 13 as well as their respective lateral clearance must be provided to be determined so that the rear lateral faces of the teeth, with reference to the direction of screwing, penetrate at least partially in said notches and the lateral faces of said teeth are in abutment against the rear lateral faces of said notches before attaining the limiting value of the tensile strength of the zone of connection.

The teeth 23 are disposed on the periphery of the strip 2 so as to distribute the effort of clipping regularly.

After clipping, any unscrewing releases the closure 1 with rupture of the zone of connection 12. Once the bead 20 is clipped by passage beneath flange C, inviolability is therefore ensured.

Moreover, hold of the bead 20 is facilitated when the width of its upper face 20a is greater than or equal to the width of the flange of the recipient.

The numbers, the distribution of the teeth 23 and the notches 13 as well as the vertical clearance between said teeth and said notches and/or the lower edge of the closure are generally determined as a function of the mechanical resistance of the zone of connection and their respective horizontal surface for mutual bearing contact, necessary for transmitting the vertical effort of clipping.

In an optimalized variant embodiment as shown in FIG. 4, it may be provided to increase the width of the bead 20 towards the inside so that the ratio between the inner diameter of the projecting part of said bead and the outer diameter of the neck G beneath the flange C makes it possible, after clipping, to create a slight residual bending of the lower part of the strip 2 towards the axis of the closure. This arrangement renders inviolability optimum.

Under these conditions, the upper face 20a of the bead 20 remains, even after clipping, inclined upwardly beneath the flange C in the manner of a hook.

According to another variant shown in FIG. 5, the bead 20 presents a substantially vertical connecting face 20c between the upper face 20a and the lower inner face 20b in order to rigidify hold.

According to yet another variant shown in FIG. 6, the lower inner face 20b of the bead 20 extends in the same inclined plane from the projecting end to the lower end of the strip 2 without line of inflexion.

What is claimed is:

1. A closure device for a recipient with a threaded neck, comprising a tapped closure having a lateral wall and a lower part attached to a guarantee strip by a zone of connection with low mechanical resistance, said strip presenting an elastically deformable, inner, annular bead with a lower inner face inclined at an angle with respect to an axis of the closure, for clipping beneath a holding flange made on a lower periphery of said neck by forced screwing of the closure; and an outer peripheral boss on the strip wherein said outer peripheral boss is separated from said bead by a zone with controlled elastic deformation, wherein when screwing the closure, the deformation zone permits a bending and a conformance of a lower part of the strip relative to the axis of the neck until the inclined lower face of the bead becomes substantially parallel to said axis; and an upper face of the boss and a lower edge of the lateral wall of the closure have formed therein, respectively, at least one tooth and at least one notch, said tooth being temporarily received in said notch during screwing when said bead axially abuts the holding flange in order to preclude any relative rotational displacement of the closure with respect to the strip and to ensure clipping of the closure to the recipient without deteriorating the zone of connection.

2. The device of claim 1 wherein the width of an upper face of the bead is at least equal to the width of the flange of the recipient.

3. The device of claim 1 wherein an upper face of the bead is substantially perpendicular to the axis of the closure.

4. The device of claim 1 wherein the zone with controlled deformation has an inner face with curvature and inclination with respect to the axis of the closure.

5. The device of claim 1 wherein a ratio between an inner diameter of the bead and an outer diameter of the neck beneath the flange is such that, after clipping, a lower part of the strip is inclined toward the axis of the closure.

6. The device of claim 1 wherein the bead defines a substantially vertical face between an upper face and a lower, inner face.

7. The device of claim 1, wherein a lower, inner face of the bead defines a line of inclination.

8. The device of claim 1 wherein dimensions of the tooth and the notch are selected so that a rear, lateral face of the tooth, with reference to a direction of screwing, penetrates at least partially into said notch and is in engagement with a rear, lateral face of said notch before achieving a limiting value of a tensile strength of the zone of connection.

9. The device of claim 1 wherein the number and distribution of the teeth and notches and their respective vertical clearances are determined as a function of the mechanical resistance of the zone of connection and respective horizontal surfaces for mutual bearing contact, in order to achieve transmission of the vertical relationship for clipping.

* * * * *